United States Patent [19]

Hobbs

[11] 4,413,535

[45] Nov. 8, 1983

[54] POWER TRANSMISSION APPARATUS

[75] Inventor: Howard F. Hobbs, Rugby, England

[73] Assignee: Variable Kinetic Drives Limited, Northamptonshire, England

[21] Appl. No.: 160,169

[22] Filed: Jun. 17, 1980

[30] Foreign Application Priority Data

Jun. 26, 1979 [GB] United Kingdom ............... 7922130

[51] Int. Cl.³ .............................................. F16H 47/08
[52] U.S. Cl. ....................................... 74/688; 74/760; 74/720; 74/705
[58] Field of Search ............... 74/688, 760, 761, 677, 74/720, 674, 705

[56] References Cited

U.S. PATENT DOCUMENTS

| | | | |
|---|---|---|---|
| 2,195,783 | 4/1940 | Ravigneaux | 74/761 |
| 2,599,559 | 6/1952 | Kelbel | 74/760 |
| 2,851,906 | 9/1958 | DeLorean | 74/688 |
| 2,885,908 | 5/1959 | DeLorean | 74/688 X |
| 2,950,631 | 8/1960 | Seybold | 74/677 |
| 3,084,569 | 4/1963 | Hause | 74/688 |
| 3,191,731 | 6/1965 | Whately | 74/761 |
| 3,246,541 | 4/1966 | General | 74/677 |
| 3,272,032 | 9/1966 | Smalinskas | 74/677 |
| 3,359,827 | 12/1967 | Chapman, Jr. et al. | 74/688 X |
| 3,425,295 | 2/1969 | Galaniuk | 74/688 X |
| 3,789,697 | 11/1982 | Hobbs | 74/677 |
| 4,056,986 | 11/1977 | Hobbs | 74/688 |
| 4,232,567 | 11/1980 | Hobbs | 74/688 X |
| 4,238,717 | 5/1982 | Arai | 74/760 |

FOREIGN PATENT DOCUMENTS 1199521  7/1970  United Kingdom .
1347045  2/1974  United Kingdom .

Primary Examiner—Leslie A. Braun
Assistant Examiner—Lawrence J. Gotts
Attorney, Agent, or Firm—Murray & Whisenhunt

[57] ABSTRACT

Power transmission apparatus having a torque converter with an input shaft, an impeller connected to the input shaft, an output turbine, a first uni-directional detent, a reactor connected to a fixed part on which to react by means of the first uni-directional detent which is arranged to prevent rotation of the reactor in a reverse direction, a circulatory turbine, a first gearing connecting the circulatory turbine to the input shaft, a second gearing connecting the first gearing to an output shaft, a second uni-directional detent, and a brake arranged to act between part of the second gearing and a stationary part. The apparatus also includes a ring gear and a holding device acting on the ring gear, both being included in the second gearing, so that when the ring gear is held stationary by the holding device, the output shaft is driven in reverse.

7 Claims, 7 Drawing Figures

4,413,535

POWER TRANSMISSION APPARATUS

BACKGROUND OF THE INVENTION

This invention relates to power transmission apparatus comprising a hydro-kinetic torque converter combined with gearing and is especially applicable to the apparatus as described in the specifications of British Pat. Nos. 1,199,521 and 1,347,045.

The apparatus claimed in British Pat. No. 1,347,045 comprises an input shaft, an impeller connected to the input shaft, an output shaft, an output turbine connected to the output shaft, a circulatory turbine disposed in the flow path between the impeller and output turbine, a first gearing and a second gearing, said first gearing connecting the circulatory turbine to the impeller; said second gearing being connected with the first gearing, the output shaft and a stationary part; whereby the first gearing can transmit driving torque from said circulatory turbine to said impeller, said driving torque increased by the second gearing is transmitted from the circulatory turbine through said first gearing to the output shaft and reaction torque is imparted to said stationary part, so that the said circulatory turbine will always rotate when the impeller rotates and in the same direction but at a speed less than that of the impeller at a lower speed part of the range of speeds of the output shaft and at a speed greater than that of the impeller at a higher speed part of said range. For reversing a separate reversing gear was attached to the rear end of the apparatus.

It is often required to provide means for reversing the direction of the output shaft and also to provide means for increasing the braking effect on the output shaft when the converter output is rotating in a forwards direction, but when the drive to the converter is reversed and applied to the shaft which normally acts as the output shaft.

For example when a converter is used in a motor vehicle it is necessary to be able to "reverse" the vehicle and desirable to provide output shaft braking when descending a steep hill.

Means to achieve these operations can be bulky and complicated and may cost as much to manufacture as the torque converter.

OBJECT OF THE INVENTION

An object of the present invention is to simplify the construction for reversing and output shaft braking. A further object is to improve the operation of the hydro-kinetic torque converter apparatus having reversing and braking means.

SUMMARY OF THE INVENTION

According to one aspect of the invention a power transmission apparatus comprises a torque converter having an input shaft, an impeller connected to the input shaft, an output turbine, a reactor and a circulatory turbine, a first gearing connecting the circulatory turbine to the input shaft, a second gearing connecting the first gearing to an output-shaft, a uni-directional detent arranged to act between part of the second gearing and a stationary part, and a carrier for the second gearing connecting the output turbine, a reversing gear mounted in the same carrier, a uni-directional clutch to connect the output shaft, and a brake to hold part of the secondary gearing stationary so that the circulatory turbine can be driven at increased speeds from said carrier so that the torque converter will become a retarder. The invention will be further described by way of example with reference to the accompanying drawings wherein:

DESCRIPTION OF PREFERRED EMBODIMENTS

Figure 1:
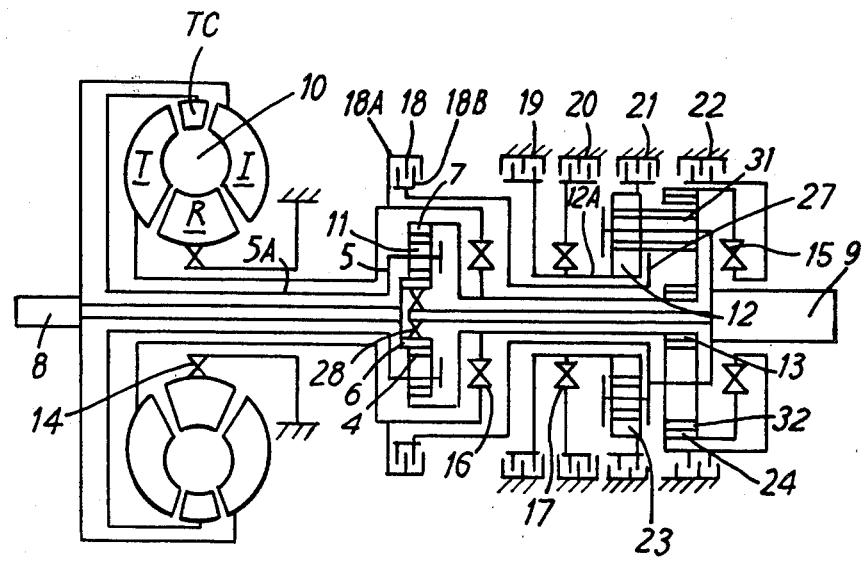
FIG. 1 is a diagrammatic illustration showing the arrangement of the main parts of the apparatus.
Figure 5A:
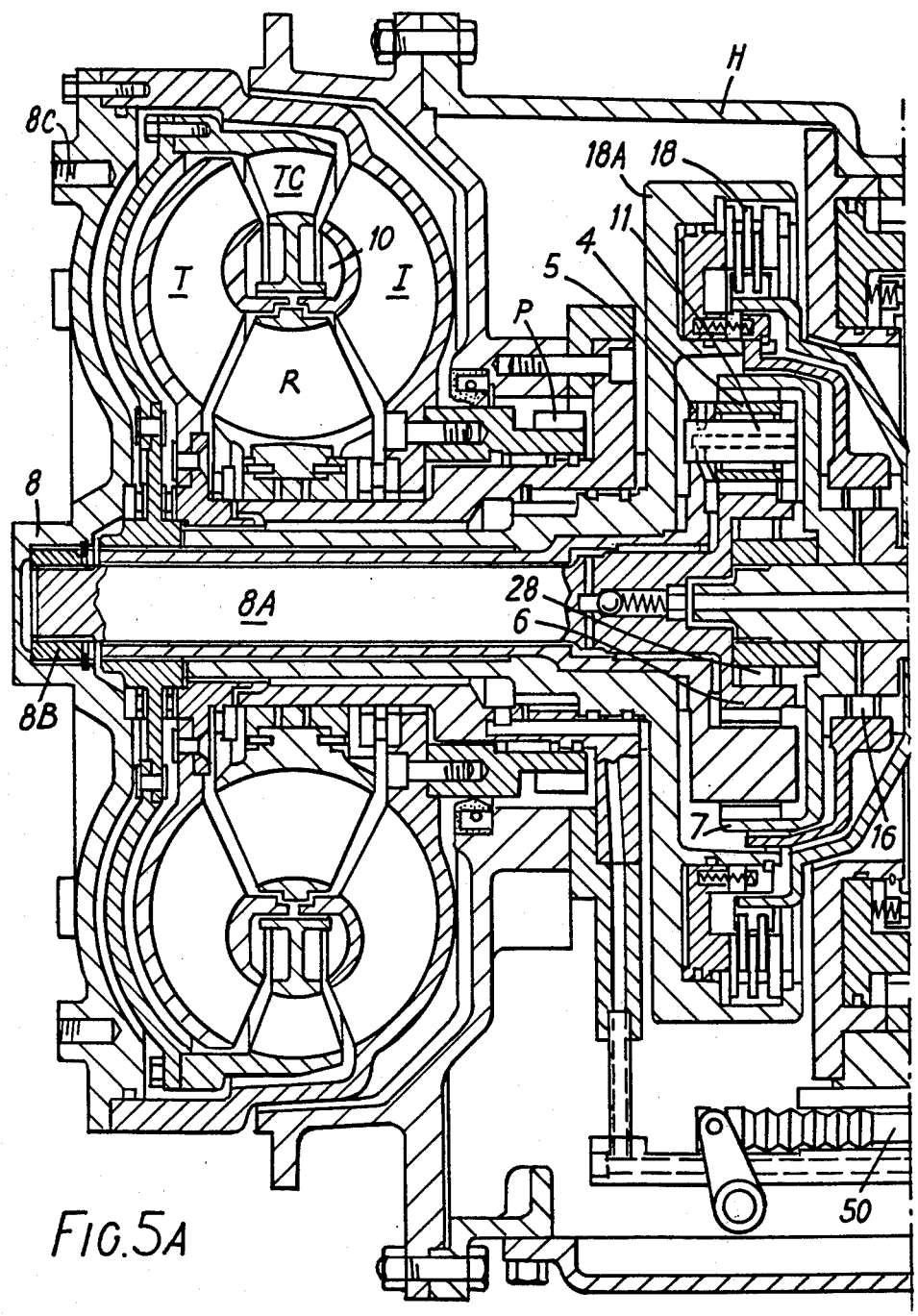
FIG. 5 (5A, 5B) shows a general arrangement of an apparatus made in accordance with the invention.

In FIGS. 1 and 5 a converter housing 8 is connected with the impeller I of the torque converter. The housing 8 is connected to an engine at bolt holes 8C. R is a reactor which reacts on the gear housing H through a one-way detent 14. T is the driving turbine and TC is the circulatory turbine. The impeller I is connected with the first gearing 11 by means of a collar 8B and shaft 8A. The gearing 11 comprises an epicyclic gear train having a sun gear 6 on the shaft 8A, a set of pinions 4 in a carrier 5 and a ring gear 7. A boss 8 supports the converter housing 8C on the collar 8B. The carrier 5 is in turn carried by shaft means 5A. The ring gear 7 is connected with a sun gear 13 of the second gearing which comprises two sun gears 12, 13, two sets of pinions 31, 32 in a carrier 27, and two ring gears 23, 24. The pinions 31, 32 mesh respectively with sun gears 12, 13 and with ring gears 23, 24 respectively and also mesh with each other.

A clutch 18 has its outer member 18A connected with the turbine T and to the sun-gear 13 through a uni-directional clutch 16.

A hollow member 12A carries the sun gear 12. A brake 19 when engaged connects the member 12A and sun gear 12 to a stationary part of the housing H.

A brake 20 when engaged, also connects the member 12A and the sun gear 12 to a stationary part but through a uni-directional detent 17.

A brake 21 when engaged connects the ring gear 23 to a stationary part and the brake 22 when engaged connects the ring gear 24 to a stationary part but only through a uni-directional detent 15.

Figure 2:
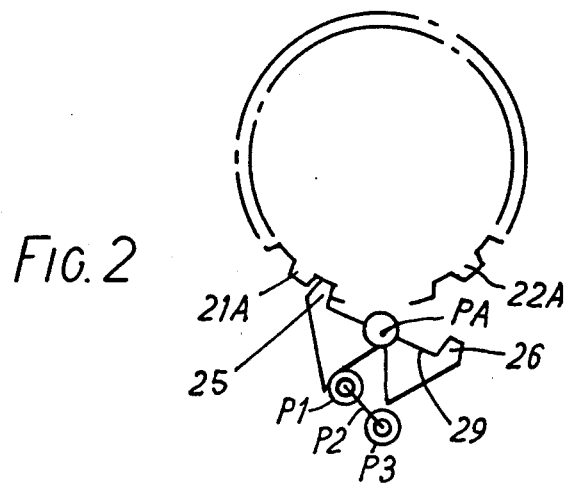
FIG. 2 is a diagrammatic illustration showing an alternative arrangement of parts of the apparatus.

In an alternative construction shown in FIG. 2, the inner rotary members of the brakes 21, 22 are replaced by toothed rings 21A and 22A which are engaged alternately by pawls 25, 26. The pawls 25, 26 are mounted on a fixed pivot PA and are moved into and out of engagement by a roller P1 carried by an arm P2 on a fixed pivot P3.

These are operated in a similar manner to parking locks as used in automatic transmission and the general construction is well known. The two pawls are connected by arm 29.

The apparatus provides a very wide range of efficient operation and for a reduced range the brake 22, detent 15 and ring gear 24 may be left out in which case the alternative construction comprises teeth 22A in place of brake 20.

The clutch and brakes may be engaged by means of oil pressure action on an annular piston in well known manner, e.g. pressure fluid may be led to space 37A when the brake 20 is to be engaged and exhausted when the brake is to be freed. The supply of fluid is controlled by a valve 50.

The carrier 27 of the second gearing is splined on to the output shaft 9.

The output shaft 9 is connected with the input part 8 through one-way detent 28.

The reactor R may be provided with pivoted blades so that the angles may be varied during operation to vary the capacity of the converter. This is not normally required, but may be used for "off-road" and other applications so that vehicle drive can be reduced during operation of auxiliary equipment.

The gear wheel P attached to the impeller is part of a gear train leading to a power take off and also to the oil pump for the apparatus.

In operation the shaft 8 (FIG. 1) drives the impeller I. The liquid leaving the impeller drives the circulatory turbine TC so that the circulatory turbine always rotates when the impeller rotates and in the same direction. The liquid leaving the circulatory turbine drives the output turbine T.

Figure 6:
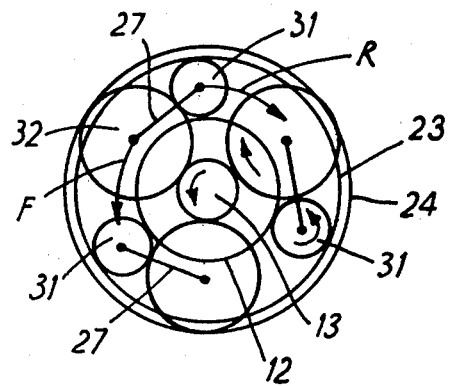
FIG. 6 is an axial illustration of some of the gearing.

If the sun gear 13 is driven by the circulatory turbine TC and/or by the turbine T through the one-way clutch 16, then by holding the sunwheel 12 with the brake 20 (FIG. 1) the normal second gearing ratio is obtained. Freewheeling TC drives the gear 13 through gear train 11. Reaction takes place through sunwheel 12, unidirectional detent 17 and brake 20. If the momentum of the liquid leaving the impeller becomes insufficient to drive the circulatory turbine, e.g. because of low input speeds or of high output speeds when the momentum of the liquid leaving the circulatory turbine may become equal to the momentum entering the TC, reaction will cease at 17 and 20 and if torque becomes positive instead of negative, in direction, the detent 17 will be unable to transmit it and the TC can run at a lower speed than it would otherwise do i.e. freewheel of TC can take place because of the uni-directional detent 17 (FIG. 1). The secondary gearing 13,12,31,32,27 connects the output shaft 9 to TC (through gearing 11); TC can drive the shaft 9 because detent 17 provides a reaction point. Shaft 9 cannot drive TC as detent 17 will not engage in this direction of drive. TC can freewheel when there is no driving torque thereon. The carrier 27 rotates in the direction F (FIG. 6). By releasing the brake 20 and holding the ring gear 23 by means of the brake 21, the carrier 27 rotates in the direction R. (Reverse is obtained by adding gear 23 and brake 21).

By applying the brake 19 and holding the sunwheel 12, TC is driven at increased speeds from the output shaft via sunwheel 13 which cannot freewheel and fluid friction provides a braking effect. The brake can carry both positive and negative reaction. A further freewheel could be provided to act between the sunwheel 13 and the sun gear 6 would drive the engine in "low" gear for braking. Also an additional brake could be provided to hold the ring gear 24 which would provide a very large braking effect. The ring gear 24 together with the detent 15 and brake 22 provides a second (and greater) second gearing ratio which extends the torque range of the apparatus. The second gearing therefore provides alternative ratios. The carrier 27 drives in the direction F. Clutch 18 is required for "neutral" but by adding the detent 16, the turbine will drive the sunwheel 13 when the clutch 18 is released. This provides a wider torque range. Neutral is still obtained as when the brakes are released the sun gear 13 becomes ineffective.

Figure 3:
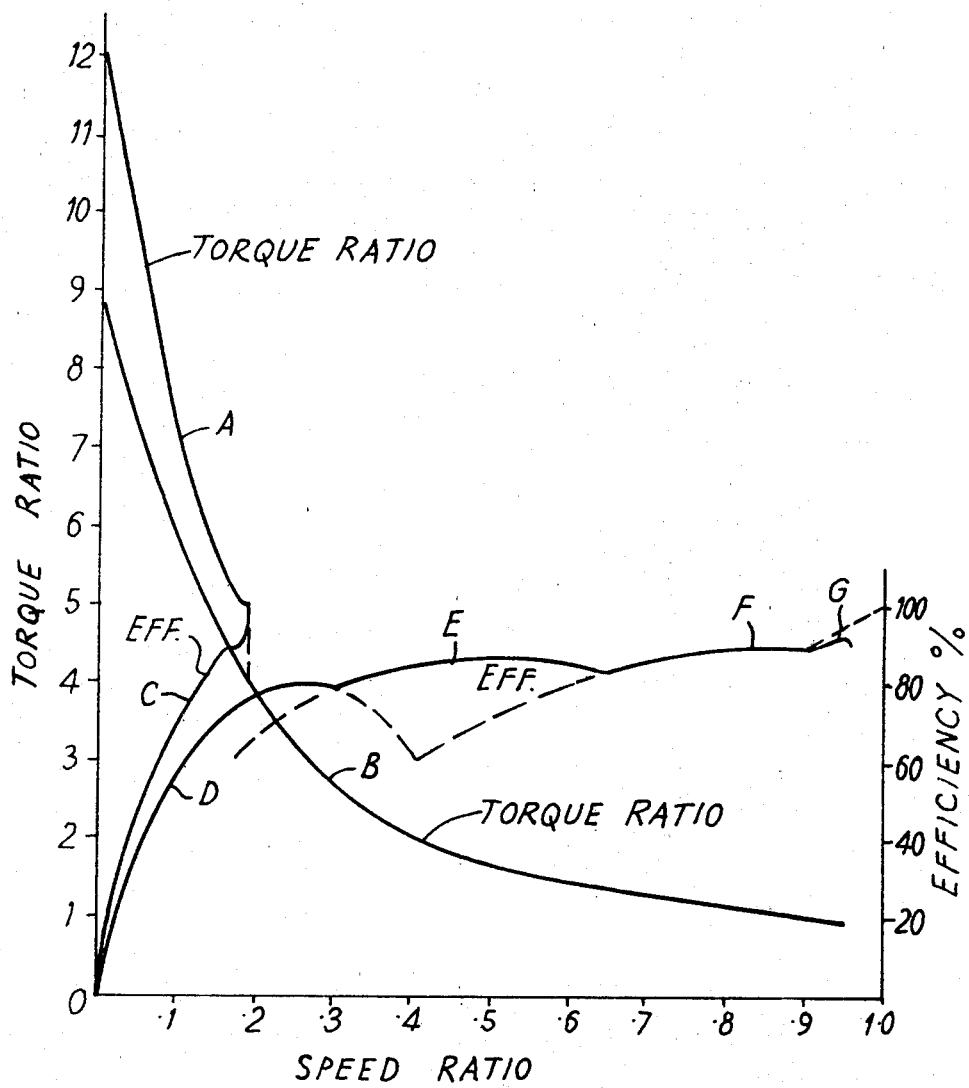
FIGS. 3 and 4 are curves showing the general performance characteristics of the apparatus.

When the clutch 18 is engaged the turbine drives the carrier 27. The torque developed on TC acts on the pinions 4 of the first gearing which produces torque on the sun wheel 6 and on the input part and impeller I, and torque on the ring gear 7 which acts on the sun wheel 13 of the second gearing thereby applying multiplied torque to the carrier 27, and to the output shaft 9, and to the ring gear 24, which reacts on a fixed part through the detent freewheel 15. By the use of gearing of the type shown in FIG. 5 and for example with ratio of the first gearing 2.785 from carrier to sunwheel and 1.56 from the carrier to the ring, and with an impeller exit of 45° the ratio of the second gearing being 5 from sunwheel to carrier with the ring gear 24 held, and 2.666 with sun gear 12 held and 24 freed, the input speed curve is nearly flat, and a wide range of operation is obtainable, for example as shown in FIG. 3. Curve B in FIG. 3 shows the torque ratios obtainable with a second ratio of 4.22:1, for example and given by sungear 13 and ring gear 24 and FIG. 4 Curve B shows torque ratios obtainable with a second ratio of 2.666:1 given by the sunwheel 13 and sunwheel 12 arrangement.

At 0.3 speed ratio the brake 20 is engaged. The change may be controlled by automatic means.

No "timing" devices are necessary and "drag" in the brake is eliminated. To revert to the low range of operation it is only necessary to release the brake 20. With brake 20 and detent 17 engaged the apparatus operates over the part of the range indicated by efficiency curve E. At 0.65 speed ratio, TC ceases to transmit torque and detent 17 permits over running. At about 0.88 speed ratio the reactor R ceases to exert torque and detent 14 permits the reactor to over-run.

Figure 4:
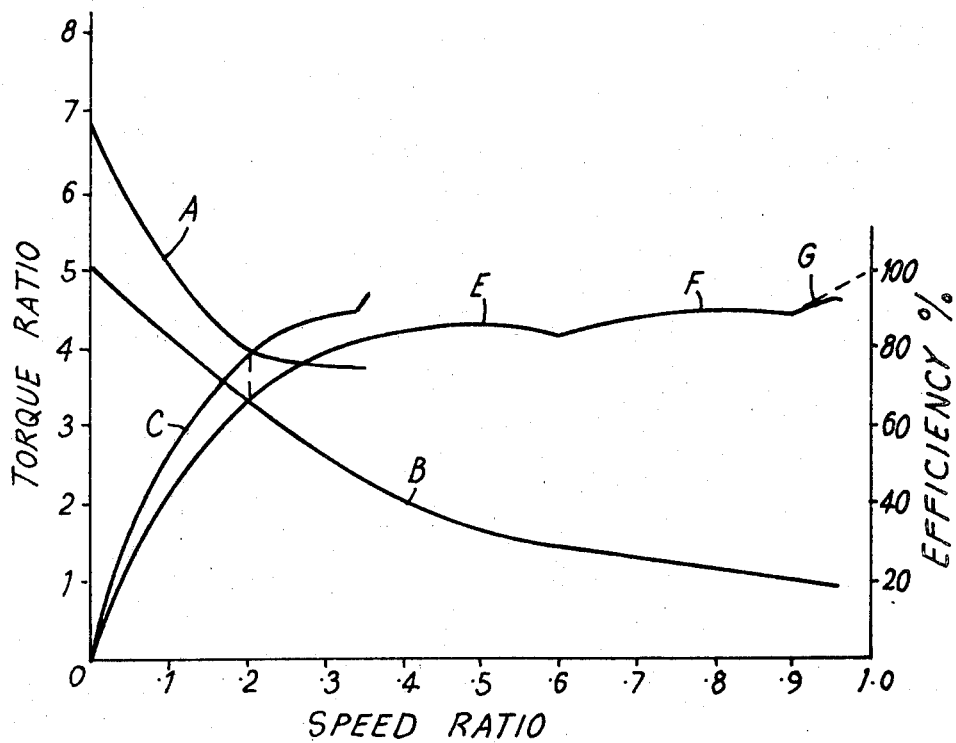

If clutch 18 is disengaged the torque from the turbine is transmitted to sunwheel 13 instead of to carrier 27 by freewheel 16 and a very high torque ratio may be obtained as curves A in FIGS. 3 and 4 for emergency or "crawler" use.

For neutral the clutch 18 and brakes 19, 20, 21, 22 are disengaged.

For reverse, clutch 18 is disengaged (or alternatively engaged to give a closer ratio i.e. input speed more nearly equals output speed) and brakes 19, 20 and 22 disengaged. i.e. brake 21 engaged and ring 23 held stationary.

As indicated above brake 22 and other parts may be left out. Performance will then be as shown FIG. 4. An emergency ratio A being available with clutch 18 disengaged. Alternatively, parts 13, 17, 19,20 may be left out. In this case curves D, F and G FIG. 3 indicate the performance, which is suitable for "off road" application.

Efficiency is low at 0.4 speed ratio but this part of the range is not important for "off road" work.

Freewheel 16 may or may not be retained for "off road" use, similarly, freewheel 28. It should be noted that the secondary gear train is such that two ratios may be provided, the one depending on the sizes of sunwheel 13 and ring gear 24 and the other depending on the difference in size of sunwheel 12, 13. The two ratios can therefore be varied widely for different applications, e.g. the part of the range covered by curve E can be made more efficient by use of a closer ratio and the part of the range D may provide greater torque ratio by use of a wider ratio.

An increase in secondary gearing ratio increases the torque output but reduces the speed ratio at which the TC ceases to operate. Reduction in impeller exit angle however, increases the speed ratio at which the TC ceases to operate.

Brake 22 may remain engaged and the change in the second gearing ratio brought about merely by engagement or disengagement of brake 20. The brake 20 may be controlled manually or a simple automatic control may be provided.

The use of the detents 15, 17 avoids over-run and power loss in a brake, and provides perfect timing for all changes with avoidance of the transmission of power by two brakes or clutches at the same time, during the change, which is normally necessary for ratio changing under power.

More than two alternative ratios could be provided by the second gearing. The use of more than one ratio may be used to increase efficiencies rather than the torque range by selection of suitable second gearing ratios.

During "forward" running the freewheel 28 prevents the output 9 running faster than the input 8. During over-run operations the input 8 runs at the same speed as the output 9.

The impeller I thus runs at the same speed as the turbine T. There is no substantial fluid circulation within the converter. Full 1:1 engine braking can be obtained at all times and "exhaust" braking can be employed.

If during over-run condition the brake 19 is applied, the circulatory turbine is driven forward by the output shaft at increased speeds and acts as an axial impeller causing flow to take place within the converter. This results in considerable resistance on the output shaft.

The converter becomes a retarder i.e. braking the output shaft. This takes place immediately the brake is applied thereby avoiding difficulties which arise with the filling and control of hydraulic retarders. The converter remains in a suitable condition for drive and the fluid within the converter flows in the same direction as for normal drive and indeed never flows in the reverse direction.

At speeds within the range of the circulatory turbine operation, if the engine throttle is opened drive will take place in the normal way even with the retarder brake still applied. The retardation can thus be almost instantly varied. A further retarder brake can be mounted on ring 24 to provide a very great range of retardation. The pressure in the converter can be varied in known manner for any necessary variation of retardation. If a pivoted blade reactor is provided variation of these blades will vary the amount of retardation. Another means of retardation is to provide a brake to hold the clutch housing 18. If clutch 18 is released and the turbine held by the brake the converter becomes a retarder. Undirectional clutch 28 only engages when output 9 tries to run faster than input 8 and automatically disengages when the output shaft 9 is driven in the reverse direction, and when the input shaft 8 runs faster than the output 9 as for normal forward running.

The clutch 19 provides engine braking whenever the output tends to exceed the speed of the input.

In the apparatus shown, FIG. 2 is idling, teeth 21A, 22A rotate at low speed but if the brake 19 is engaged these parts of the apparatus are brought to rest so that the engagement of the teeth offer no difficulty. A yielding device may be used to overcome misalignment. The control of the retarder brake 19 can conveniently be by means of the brake pedal of a road vehicle.

A converter driven power take off can be provided by mounting the driving gear on the part carrying clutch 18.

The invention enables one gear train assembly to provide two alternative second gearing ratios, two reverse ratios, an emergency low ratio and an increased speed for retarder operation.

The range of torque ratios obtainable without gear change can be much greater than hitherto obtainable, from a hydro-kinetic torque converter.

A governor 33 may be driven by gears 34, 35 from the output shaft.

The purpose of the governor 33 is to provide a circuit with pressure variation according to output speed as is usual for automatic changing. Oil is lead to the circuit through a restriction and surrounds the governor. The ball valve 36 subjected to centrifugal force controls the escape of oil from the circuit through a hole 39 in the governor drive spindle. The varying pressure acts on the end of a piston valve of known construction which usually has the line pressure of the apparatus and perhaps also a spring, acting on the other end, so that at given speeds the piston valve will be moved in its bore thereby opening pressure to or exhausting space 37A.

Automatic "changing" is only required when the apparatus has two or more ranges of operation and then is not essential.

| | Engaged | Disengaged |
|---|---|---|
| For single range:- | | |
| Neutral | | 18, 19, 20, 21 (22 left out) |
| Low (emergency) | 20 | 18, 19, 21 |
| Forward | 18, 20 | 19, 21 |
| Reverse | 21 | 18, 19, 20 |
| Retard | 19, 18, 20 | 21 |
| For dual range (automatic engagement and release of brake 20) | | |
| Low Range | | |
| Forward | 18, 22 | 19, 20, 21 |
| Reverse | 21 | 18, 19, 20, 22 |
| Emergency Low (Low Range) | 22 | 18, 19, 20, 21 |
| Retard | 19, 18, 22 | |
| High Range | | |
| Forward | 18, 20, 22 | 19, 21 |
| Retard | 19, 18, 20, 22 | 21 |

I claim:

1. A power transmission apparatus comprising a torque converter having an input shaft (8), an impeller connected to the input shaft, an output turbine, a first uni-directional detent (14), a reactor connected to a fixed part on which to react by means of said first uni-directional detent which is arranged to prevent rotation of the reactor in a reverse direction, and a circulatory turbine, a first gearing (11) connecting the circulatory turbine to the input shaft (8), a second gearing (12, 13, 27, 31, 32) connecting the first gearing to an output shaft (9), a second uni-directional detent (17) and a brake (20) arranged to act between part of the second gearing and a stationary part, the apparatus having a ring gear (23) and a holding device (21, or 21A) acting on said ring gear (23), both being included in the second gearing, whereby when the ring gear is held stationary by said holding device, the output shaft is driven in reverse.

2. A power transmission apparatus according to claim 1, having a second ring gear (24) also connected with the second gearing, a second detent (15) and a second holding device, said second ring gear acting through said second detent and said second holding device on said stationary part thereby providing an alternative second gearing ratio and an additional range of torque ratios.

3. A power transmission apparatus according to claim 1 or 2, having a clutch (18) to disconnect the turbine from a carrier (27) forming part of the second gearing and from the output shaft (9).

4. A power transmission apparatus according to claim 3 having a freewheel (16) to automatically connect the output turbine to a sunwheel (13) forming part of the second gearing when this turbine is disconnected from the carrier (27), thereby providing a further range of torque ratios.

5. A power transmission apparatus according to claim 1 having a freewheel (28) to connect the output shaft to the input shaft when the output shaft tends to over-run the input shaft.

6. A power transmission apparatus according to claim 1, having a brake (19) connected to a gear-wheel of the second gearing to cause the circulatory turbine to be driven from the output shaft at increased speeds, thereby causing the apparatus to effect output shaft braking.

7. A power transmission apparatus of the kind described as claimed in claim 2 wherein at least one of said holding devices consists of teeth engageable by pawls carried on said stationary part.

* * * * *